(12) United States Patent
Sawahata et al.

(10) Patent No.: US 12,261,513 B2
(45) Date of Patent: Mar. 25, 2025

(54) ELECTRIC SYSTEM FOR COOLING A MOTOR AND INVERTER UNIT

(71) Applicant: Hitachi Astemo, Ltd., Hitachinaka (JP)

(72) Inventors: Masanori Sawahata, Tokyo (JP); Masahiro Hori, Tokyo (JP); Hideaki Goto, Tokyo (JP); Takeshi Tokuyama, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 292 days.

(21) Appl. No.: 17/917,509

(22) PCT Filed: Jan. 29, 2021

(86) PCT No.: PCT/JP2021/003170
§ 371 (c)(1),
(2) Date: Oct. 6, 2022

(87) PCT Pub. No.: WO2021/210242
PCT Pub. Date: Oct. 21, 2021

(65) Prior Publication Data
US 2023/0155453 A1    May 18, 2023

(30) Foreign Application Priority Data

Apr. 14, 2020   (JP) ................................. 2020-072497

(51) Int. Cl.
*H02K 3/50*      (2006.01)
*H02K 7/116*     (2006.01)
(Continued)

(52) U.S. Cl.
CPC .............. *H02K 9/193* (2013.01); *H02K 3/50* (2013.01); *H02K 7/116* (2013.01); *H02K 11/33* (2016.01); *H02K 2203/09* (2013.01)

(58) Field of Classification Search
CPC ............ H02K 3/50; H02K 5/22; H02K 5/225; H02K 7/116; H02K 9/19; H02K 9/193; H02K 11/30; H02K 11/33; H02K 2203/09
See application file for complete search history.

(56) References Cited

U.S. PATENT DOCUMENTS 6,323,613 B1 * 11/2001 Hara ..................... H02K 16/00
903/952

FOREIGN PATENT DOCUMENTS

| JP | 2007159314 A | * | 6/2007 |
| JP | 2010268633 A | * | 11/2010 |

(Continued)

OTHER PUBLICATIONS

Endo, Machine Translation of JP2007159314, Jun. 2007 (Year: 2007).*

(Continued)

*Primary Examiner* — Eric Johnson
(74) *Attorney, Agent, or Firm* — Foley & Lardner LLP

(57) ABSTRACT

An object of the present invention is to improve cooling capability of a bus bar with a simple system.

An electric system includes a motor unit including a stator and a rotor, the motor unit being cooled by a refrigerant, an inverter unit that supplies electric power to a winding of the stator, a wiring portion that transmits electric power output from the inverter unit to the motor unit, and a pipe that supplies or discharges a refrigerant to or from the motor unit. The pipe is provided at a position at which the wiring portion can exchange heat with an oily medium cooled by the pipe.

9 Claims, 10 Drawing Sheets

(51) Int. Cl.
    *H02K 9/193*     (2006.01)
    *H02K 11/33*     (2016.01)

(56) References Cited

FOREIGN PATENT DOCUMENTS

| JP | 2011-234590 A | 11/2011 |
|----|---------------|---------|
| JP | 2012-105457 A | 5/2012  |
| JP | 2012-191719 A | 10/2012 |

OTHER PUBLICATIONS

Okazawa, Machine Translation of JP2010268633, Nov. 2010 (Year: 2010).*

English Translation of the International Search Report issued in corresponding International Application No. PCT/JP2021/003170, dated May 11, 2021.

\* cited by examiner

ELECTRIC SYSTEM FOR COOLING A MOTOR AND INVERTER UNIT

TECHNICAL FIELD

The present invention relates to an electric system of a vehicle driving device.

BACKGROUND ART

In recent years, use of a motor as a vehicle driving device has been expanded. A motor as a vehicle driving device is driven by an inverter, and drives a vehicle through a gear arranged at an output shaft end of the motor. The gear has a function of reducing a rotational speed of the motor and transmitting motor torque to the axle. In such an electric system, there is demand for using lubricating oil of the gear for coil cooling of the motor to improve cooling capability of a coil, downsizing the motor, and obtaining high torque.

As a background art of the present technical field, there is PTL 1 (JP 2012-105457 A). PTL 1 discloses a motor including a rotor configured to be rotatable around a rotation axis, a stator provided around the rotor, a cooling pipe that is arranged in an oil reservoir in which oil is stored and circulates cooling water for cooling the oil in the oil reservoir, and a speed reducer having an external gear that converts a rotation speed of the rotor and stirs the oil in the oil reservoir (see claim 1).

CITATION LIST

Patent Literature

PTL 1: JP 2012-105457 A

SUMMARY OF INVENTION

Technical Problem

In such an electric system, heat generation of a wiring (for example, a bus bar) connecting the motor and an inverter is large, and it is required to cool the bus bar. When lubricating oil is used for cooling the bus bar, temperature of the lubricating oil increases, and thus the lubricating oil needs to be further cooled. On the other hand, installation of an oil cooler generally used for cooling lubricating oil increases cost.

For this reason, there is demand for improving cooling capability for the bus bar with a simple system.

Solution to Problem

A representative example of an invention disclosed in the present application is as described below. That is, the representative example is an electric system including a motor unit including a stator and a rotor, the motor unit being cooled by a refrigerant, an inverter unit that supplies electric power to a winding of the stator, a wiring portion that transmits electric power output from the inverter unit to the motor unit, and a pipe that supplies or discharges a refrigerant to or from the motor unit. The pipe is provided at a position at which the wiring portion can exchange heat with an oily medium cooled by the pipe.

Advantageous Effects of Invention

According to the present invention, a bus bar can be cooled by lubricating oil of a gear, and cooling capability of the motor can be improved.

An object, a configuration, and an advantageous effect other than those described above will be clarified in description of embodiments described below.

DESCRIPTION OF EMBODIMENTS

Figure 1:
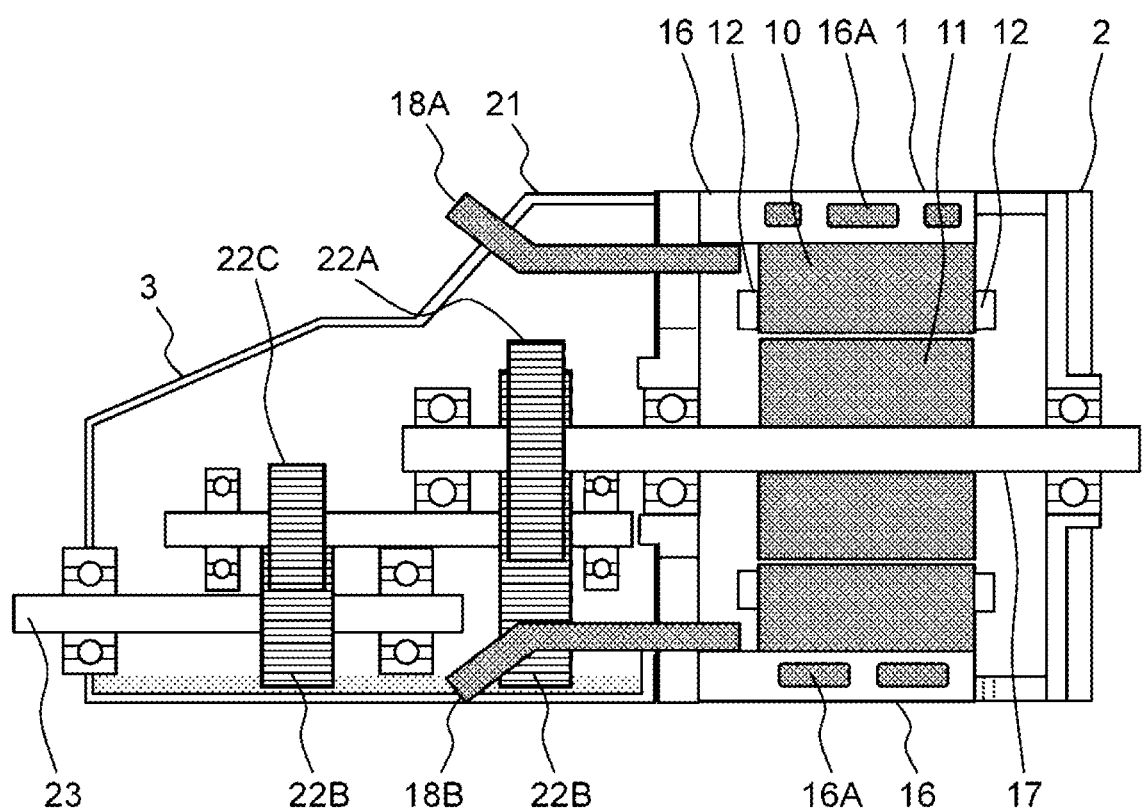
FIG. 1 is a lateral cross-sectional view of an electric system according to a first embodiment of the present invention.
Figure 2:
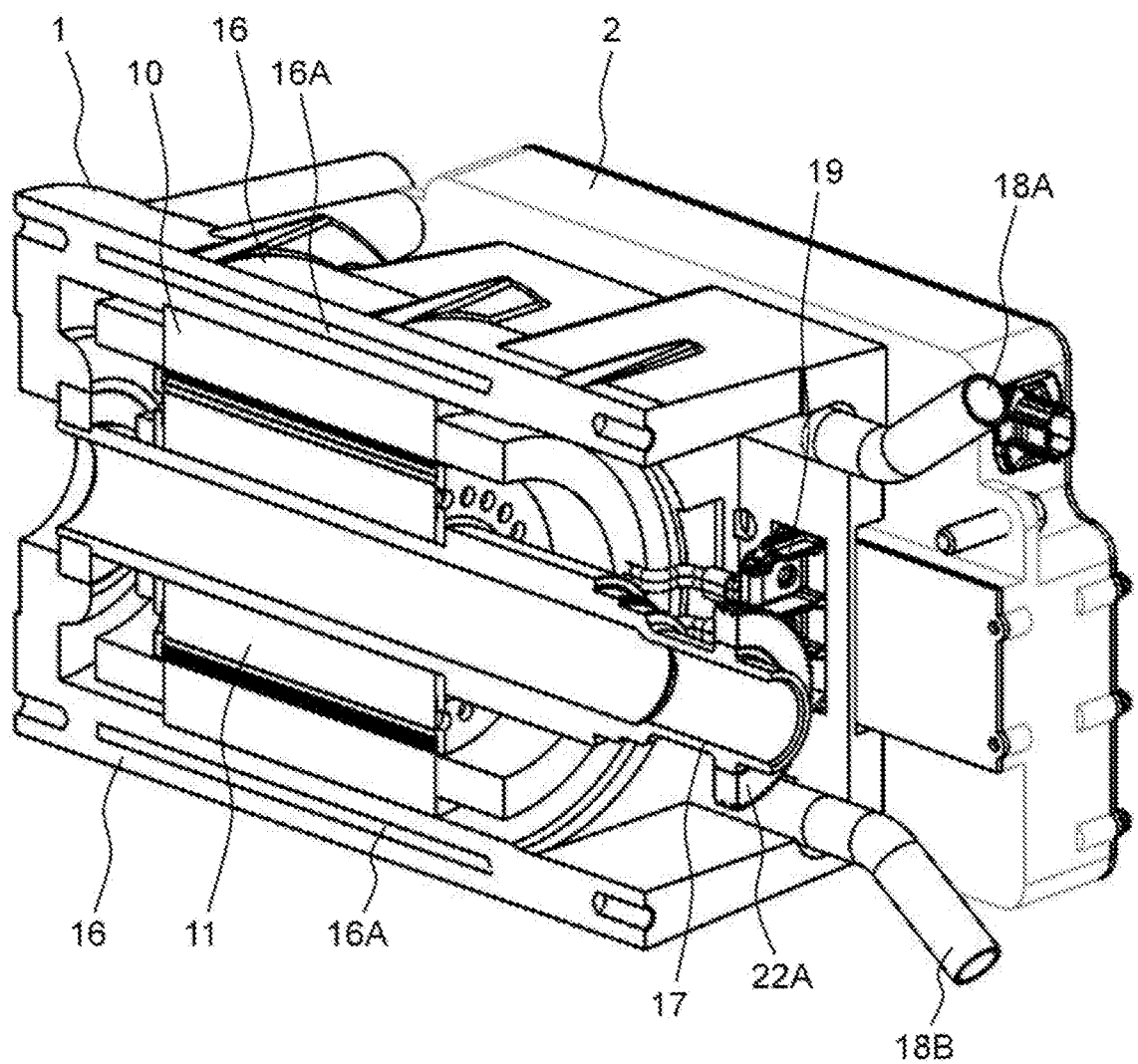
FIG. 2 is a cross-sectional perspective view of a motor and an inverter portion according to the first embodiment of the present invention.
Figure 3:
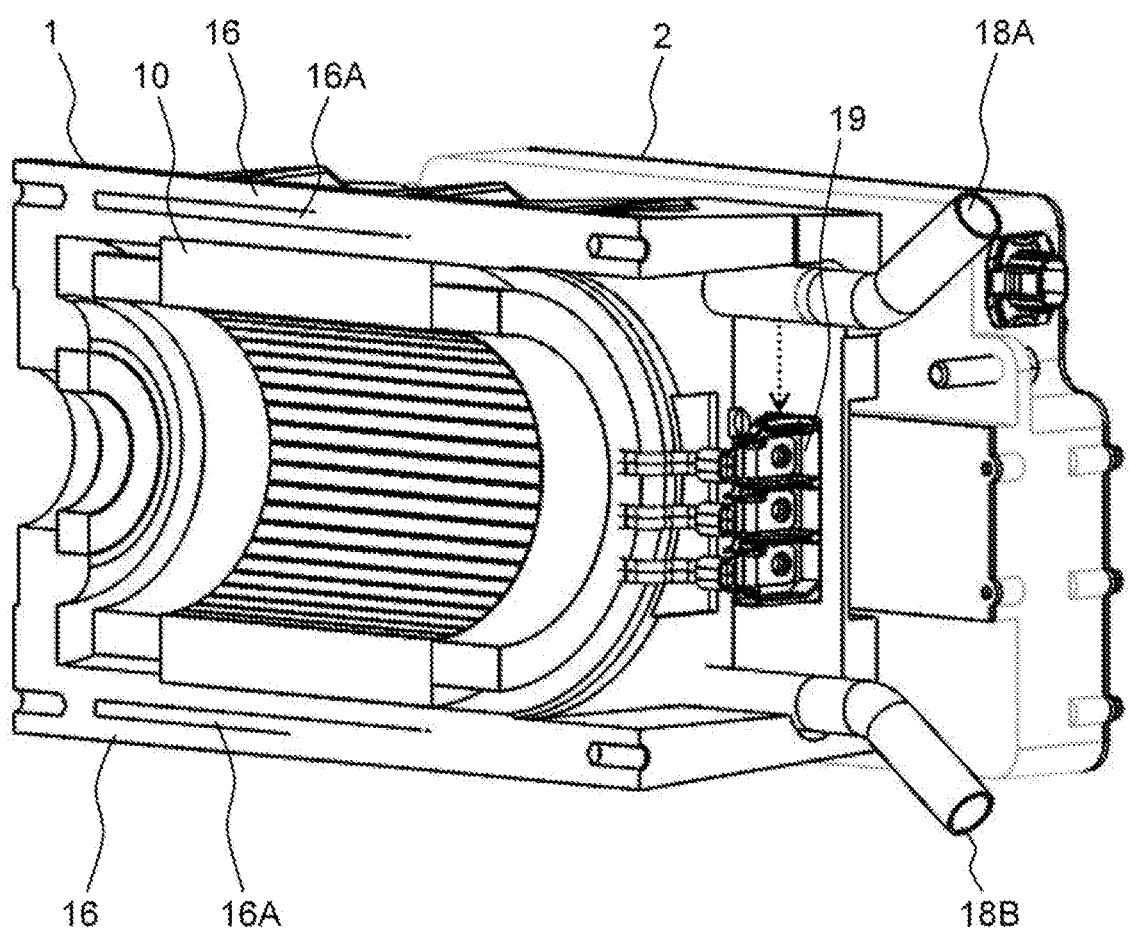
FIG. 3 is a cross-sectional perspective view of the motor and the inverter portion according to the first embodiment of the present invention.
Figure 4:
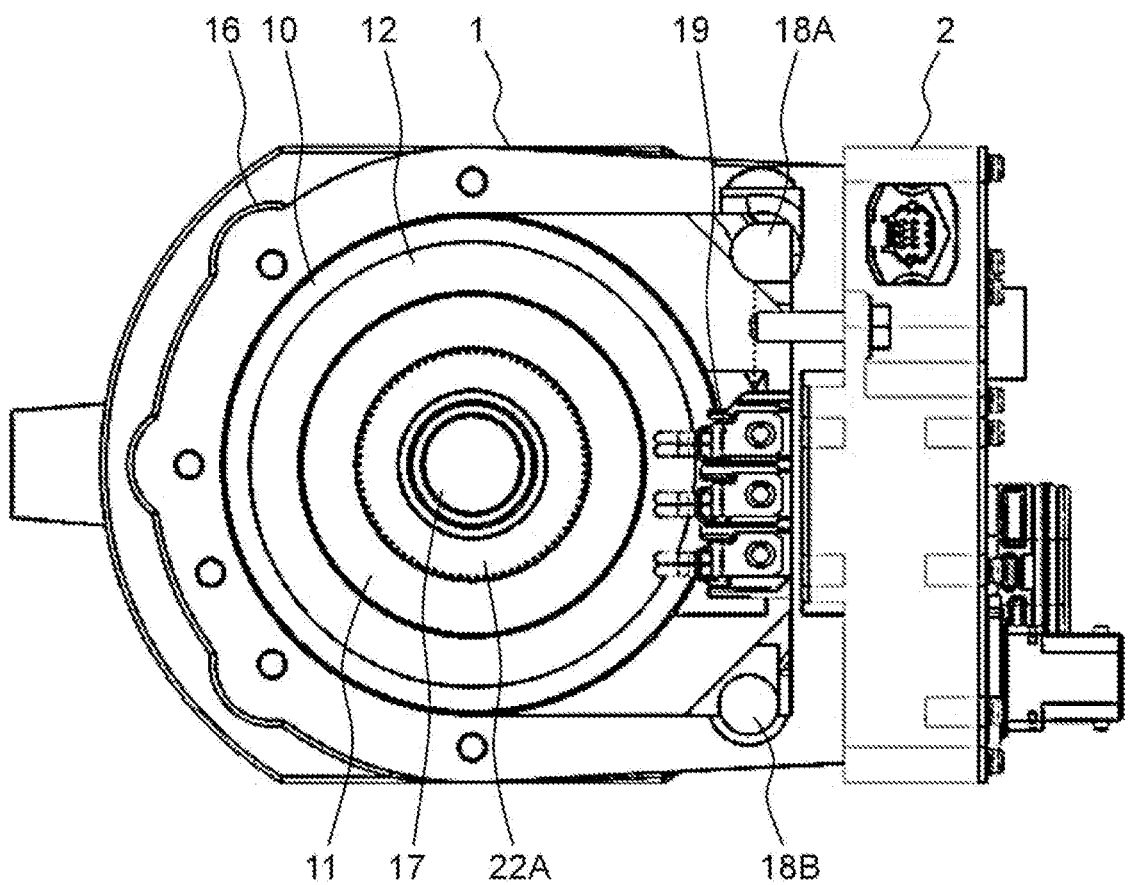
FIG. 4 is a front view of the electric system according to the first embodiment of the present invention as viewed from an axial direction.

<First embodiment> FIG. 1 is a lateral cross-sectional view of an electric system of a first embodiment. FIGS. 2 and 3 are cross-sectional perspective views of a motor and an inverter portion of the electric system of the first embodiment, and FIG. 3 illustrates a state in which a rotor and a gear are removed from FIG. 2. FIG. 4 is a front view of the electric system of the first embodiment as viewed from an axial direction.

The electric system of the present embodiment includes a motor 1, an inverter 2 arranged at a position adjacent to the motor 1, and a gear assembly 3 arranged in an output direction of the motor 1. In the motor 1, a rotor 11 is arranged on the inner peripheral side of a stator 10, and a winding 12 is wound around a stator core. A type of the motor 1 may be a permanent magnet motor having a permanent magnet, a synchronous motor having a field winding, an induction motor having a squirrel cage conductor, a reluctance motor formed only of a rotor core, or the like, and a component for generating a magnetic field from a rotor and its shape are not limited. The winding 12 is configured by distributed winding or concentrated winding, the winding 12 may be composed of either a corner wire or a round wire, and a winding method and a type of the winding are not limited. In the motor 1, power (for example, three-phase AC) is supplied to the motor 1 via a terminal of a bus bar 19.

The stator 10 is fixed to the inner peripheral side of a frame 16 by shrink fitting, bolt fastening, or the like. The frame 16 is formed by low-pressure casting, die casting, or the like, and is not limited in shape or size, including a bracket that supports a bearing. A cooling water flow path 16A is formed in the frame 16, and the cooling water flow path 16A is connected to an upper pipe 18A and a lower pipe 18B. That is, cooling water flows in from, the upper pipe 18A, cools the motor 1 while passing through the cooling water flow path 16A, and is discharged from the lower pipe 18B. Further, the cooling water flow path 16A preferably also communicates with a case of the inverter 2 to cool the inverter 2 with cooling water. The inverter 2 may be cooled via the frame 16 of the motor 1. A refrigerant flowing through the upper pipe 18A, the cooling water flow path 16A, and the lower pipe 18B may be water or another type of liquid such as oil.

A switching element of the inverter 2 may be an IGBT, SIC, or the like, and a type and a shape of the inverter 2 are not limited. A motor input terminal drawn from the winding 12 is connected to an inverter output terminal via the bus bar 19, and when current and voltage are applied from the inverter 2, current flows through the winding 12 and a rotating magnetic field is generated, and the rotor 11 is rotated to generate torque. The rotor 11 is connected to a gear assembly 3 through a shaft 17, and a gear output shaft 23 inside the gear assembly 3 is connected to an axle so that a vehicle is driven. As illustrated in FIG. 2, the shaft 17 may be a hollow shaft or a solid shaft, and a shape and a dimension of the shaft 17 are not limited.

In the gear assembly 3, a plurality of gears 22A to 22D are arranged inside a gear box 21, and a gear ratio of the gears 22A to 22D is configured such that rotation of the motor 1 is decelerated by the gears 22A to 22D and output from the gear output shaft 23. In the example illustrated in FIG. 1, a gear is composed of a parallel shaft spur gear, but the gear may be a single planetary gear or a combination of a planetary gear and a spur gear, and a configuration as to whether a parallel shaft or a single shaft is used and a gear ratio are not limited. Further, although not illustrated in the diagram, a differential gear is usually arranged between the gear assembly 3 and an axle.

As shown in gray in FIG. 1, an oily medium is retained in a lower portion in the gear assembly 3, the gear 225 is immersed in the oily medium, and a space between the gear 225 and the gear 22A is lubricated as the gear 22B rotates. Further, the oily medium is scraped upward with rotation of the gears 22B and 22A and is applied to the upper pipe 18A. The oily medium and cooling water exchange heat in an upper portion of the motor, and the oily medium is cooled by the cooling water in the upper pipe 18A.

Further, as illustrated in FIGS. 2 to 4, the bus bar 19 is provided immediately below the upper pipe 18A, and the oily medium scraped upward by the gears 225 and 22A drops from the upper pipe 18A to the bus bar 19 as indicated by a dotted line in FIGS. 3 and 4, so that the bus bar 19 is cooled with the oily medium. Furthermore, the lower pipe 18B is provided immediately below the bus bar 19, and the oily medium drops from the bus bar 19 to the upper pipe 18A so that the oily medium is cooled with the cooling water in the lower pipe 18B.

Further, the oily medium may be introduced into the frame 16, and the lower pipe 18B may be immersed in the oily medium retained in a lower portion of the frame 16 to cool the cooling water flowing through the lower pipe 18B.

In the present embodiment, the oily medium scraped upward by the gears 22B and 22A can be cooled by the cooling water flowing through the upper pipe 18A, and the bus bar 19 can be cooled by the oily medium that drops from the upper pipe 18A. For this reason, cooling capability of the motor 1 and the inverter 2 can be improved without addition of a water pipe, and a cooling water pipe for cooling the motor 1 and the inverter 2 can be simplified.

<Second embodiment> Next, the electric system according to a second embodiment will be described. The electric system of the second embodiment is provided with a fin 30 protruding from the cooling water pipes 18A and 18B. Note that, in the second embodiment, description of a configuration having the same function as that of the above-described embodiment will be omitted, and different configurations will be mainly described.

Figure 5:
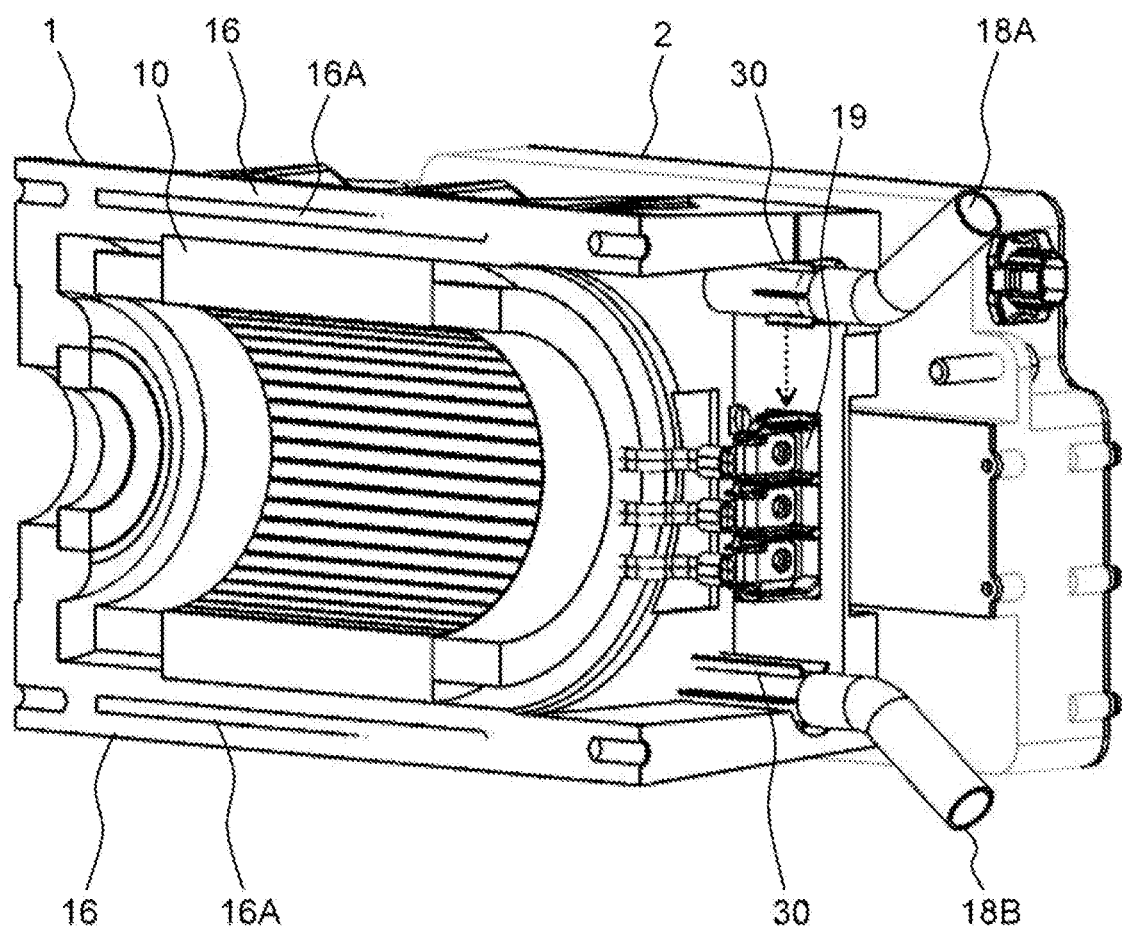
FIG. 5 is a cross-sectional perspective view of the motor and the inverter portion according to a second embodiment of the present invention.

FIG. 5 is a cross-sectional perspective view of the motor and the inverter portion of the electric system of the second embodiment.

The fin 30, which is a protruding portion protruding from an outer surface of the upper pipe 18A with which an oily medium is in contact, is provided. The protruding portion may be the fin 30 having a plate shape illustrated in the diagram, or may have a pin shape protruding from an outer surface of the upper pipe 18A. As illustrated by a dotted line, the fin 30 is provided immediately above the bus bar 19 so that the oily medium drops from the fin 30 onto the bus bar 19. Further, as illustrated in the diagram, the protruding portion may have a fin shape that is flat in an extending direction of the upper pipe 18A, but may have a spiral shape on an outer surface of the upper pipe 18A, and may have various shapes. Note that the fin 30 preferably extends at least vertically below the upper pipe 18A.

As illustrated in the diagram, the fin 30 may be provided on both of the upper pipes 18A and 18B, or may be provided on either of them. Desirably, the fin 30 is preferably provided on at least the upper pipe 18A.

In the present embodiment, a surface area of the cooling water pipes 18A and 18B can be increased, and cooling capability for an oily medium by cooling water can be improved.

<Third embodiment> Next, the electric system according to a third embodiment will be described. In the electric system of the third embodiment, the cooling water pipes 18A and 18B are bent at positions in contact with an oily medium. Note that, in the third embodiment, description of a configuration having the same function as that of the above-described embodiment will be omitted, and different configurations will be mainly described.

Figure 6:
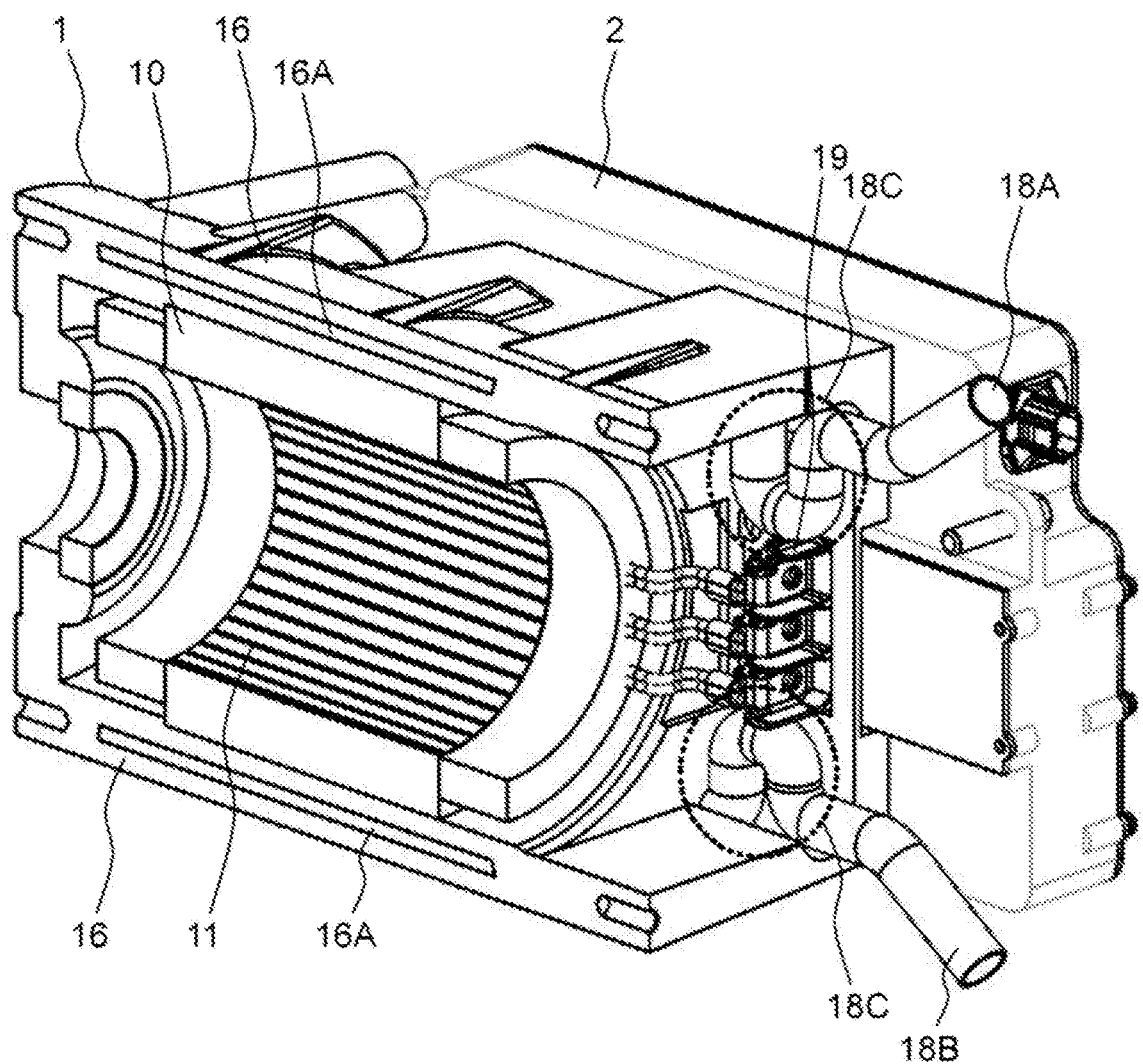
FIG. 6 is a cross-sectional perspective view of the motor and the inverter portion according to a third embodiment of the present invention.

FIG. 6 is a cross-sectional perspective view of the motor and the inverter portion of the electric system of the third embodiment.

In the third embodiment, the upper pipe 18A is bent downward at a position in contact with an oily medium to form a U-shape. A lowermost portion of the upper pipe 18A may be provided immediately above the bus bar 19 so that an oily medium drops onto the bus bar 19 from the upper pipe 18A. A bent portion of the upper pipe 18A may extend in a vertical direction or may extend obliquely downward.

Further, the lower pipe 18B is bent upward at a position in contact with an oily medium to form a U-shape. The lower pipe 18B is preferably provided immediately below the bus bar 19 so that an oily medium that drops from above the bus bar 19 is in contact with a bent portion of the lower pipe 18B.

As illustrated in the diagram, the bent portion may be provided on both of the upper pipes 18A and 18B, or may be provided on either of them. Desirably, the fin 30 is preferably provided on at least the upper pipe 18A.

In the present embodiment, an area where an oily medium is in contact with the cooling water pipes 18A and 18B is increased, and the cooling capability for an oily medium by cooling water can be improved.

<Fourth embodiment> Next, the electric system according to a fourth embodiment will be described. In the electric system of the fourth embodiment, a liquid reservoir 31 is provided below the upper pipe 18A. Note that, in the fourth embodiment, description of a configuration having the same function as that of the above-described embodiment will be omitted, and different configurations will be mainly described.

Figure 7:
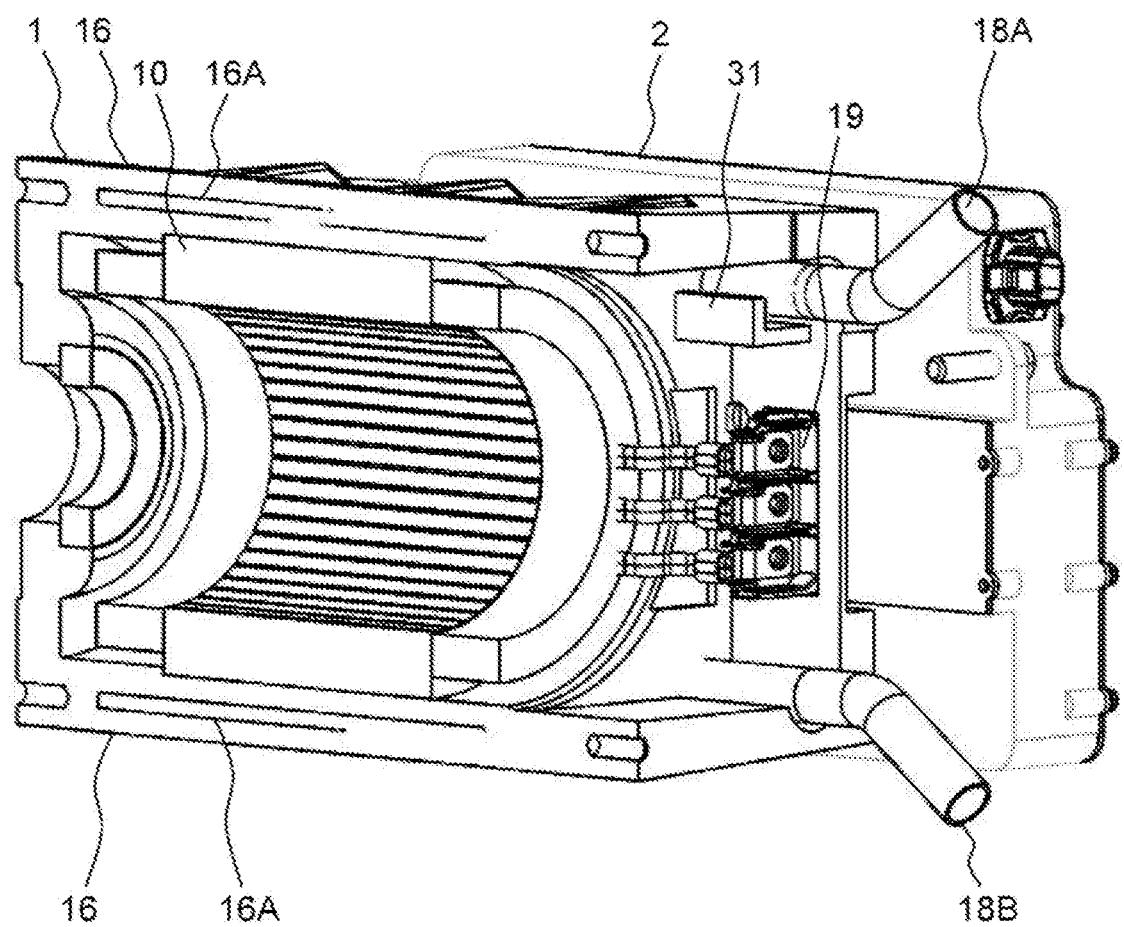
FIG. 7 is a cross-sectional perspective view of the motor and the inverter portion according to a fourth embodiment of the present invention.
Figure 8:
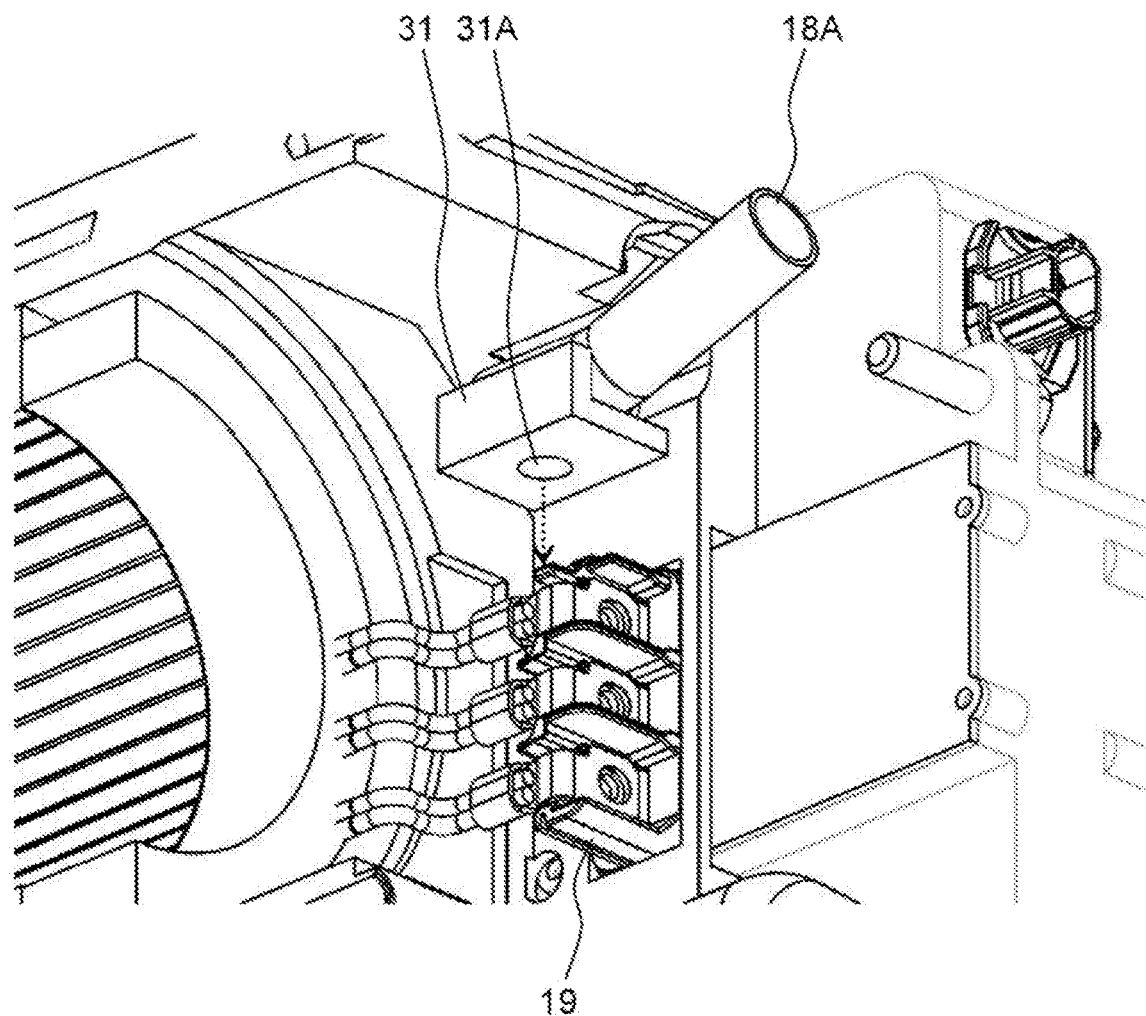
FIG. 8 is a cross-sectional perspective view of a liquid reservoir of the fourth embodiment of the present invention as viewed from below.

FIG. 7 is a cross-sectional perspective view of the motor and the inverter portion of the electric system of the fourth embodiment, and FIG. 8 is a cross-sectional perspective view of the liquid reservoir of the fourth embodiment as viewed from below.

In the fourth embodiment, the liquid reservoir 31 is provided below the upper pipe 18A. The liquid reservoir 31 has, for example, a bottom surface and a side wall having a predetermined height, and stores a predetermined amount of an oily medium scraped upward by the gears 22B and 22A until a liquid level of the stored oily medium overflows beyond the height of the side wall. A discharge portion serving as an outlet of an overflowing oily medium is preferably provided immediately above the bus bar 19 so that the oily medium overflowing from the liquid reservoir 31 drops onto the bus bar 19. In the oily medium stored in the liquid reservoir 31, at least a part of the upper pipe 18A is immersed and the oily medium is cooled by cooling water flowing through the upper pipe 18A.

Further, a discharge portion may be provided on the bottom surface of the liquid reservoir 31. For example, a discharge hole 31A may be provided immediately above the bus bar 19 on the bottom surface of the liquid reservoir 31 so that an oily medium drops onto the bus bar 19 from the liquid reservoir 31 (indicated by a dotted line in FIG. 8). An inclination may be provided on the inner side of the bottom surface of the liquid reservoir 31 so that a position of the discharge hole 31A is lowered.

In the present embodiment, since an oily medium is cooled by the liquid reservoir 31, the cooling capability of the oily medium can be improved, and the bus bar 19 can be efficiently cooled. Further, the oily medium can accurately drop on the bus bar 19 by the discharge portion (for example, an outlet of the oily medium and the discharge hole 31A), and temperature of the bus bar 19 can be lowered.

<Fifth embodiment> Next, the electric system according to a fifth embodiment will be described. In the electric system of the fifth embodiment, the liquid reservoir 31 is provided below the upper pipe 18A. Note that, in the fifth embodiment, description of a configuration having the same function as that of the above-described embodiment will be omitted, and different configurations will be mainly described.

Figure 9:
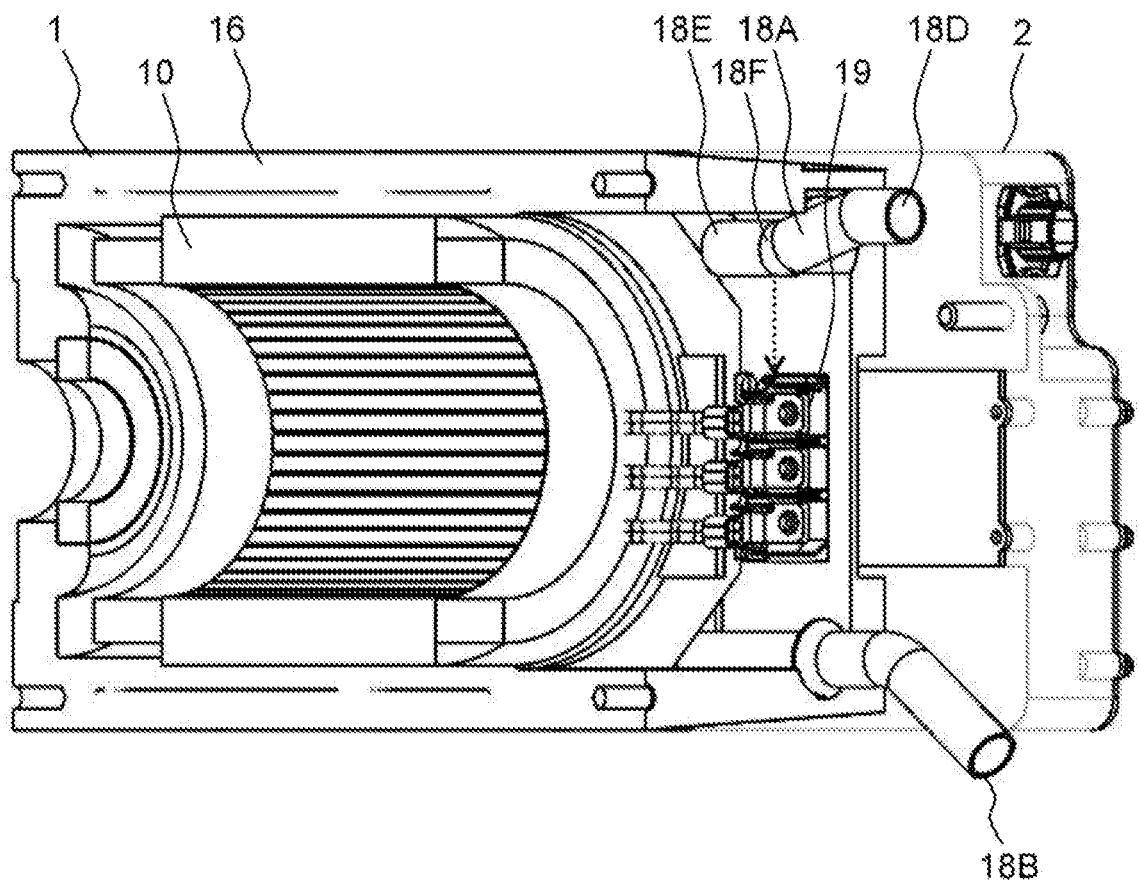
FIG. 9 is a cross-sectional perspective view of the motor and the inverter portion according to a fifth embodiment of the present invention.

FIG. 9 is a cross-sectional perspective view of the motor and the inverter portion of the electric system of the fifth embodiment.

In the fifth embodiment, in the upper pipe 18A, an inlet portion 18D of cooling water is arranged at a position higher than an outlet portion 18E in a vertical direction. That is, the upper pipe 18A has an inclined portion whose height in the vertical direction gradually decreases as a distance from the inlet portion 18D increases. Then, the upper pipe 18A is arranged at a position where a bent portion 18F where the outlet part 185 of the upper pipe 18A and the inclined portion are connected is immediately above the bus bar 19. An oily medium in contact with the upper pipe 18A flows down a lower surface of the inclined portion of the upper pipe 18A from the inlet portion 18D and drops onto the bus bar 19 from a position of the bent portion 18F as illustrated by a dotted line.

In the present embodiment, a position where an oily medium accurately drops onto the bus bar 19 is determined by the bent portion 18F so that cooling efficiency of the bus bar 19 can be improved.

<Sixth embodiment> Next, the electric system according to a sixth embodiment will be described. The electric system of the sixth embodiment is provided with axial oil passages 32 and 33 for allowing an oily medium to flow to the non-gear side. Note that, in the sixth embodiment, description of a configuration having the same function as that of the above-described embodiment will be omitted, and different configurations will be mainly described.

Figure 10:
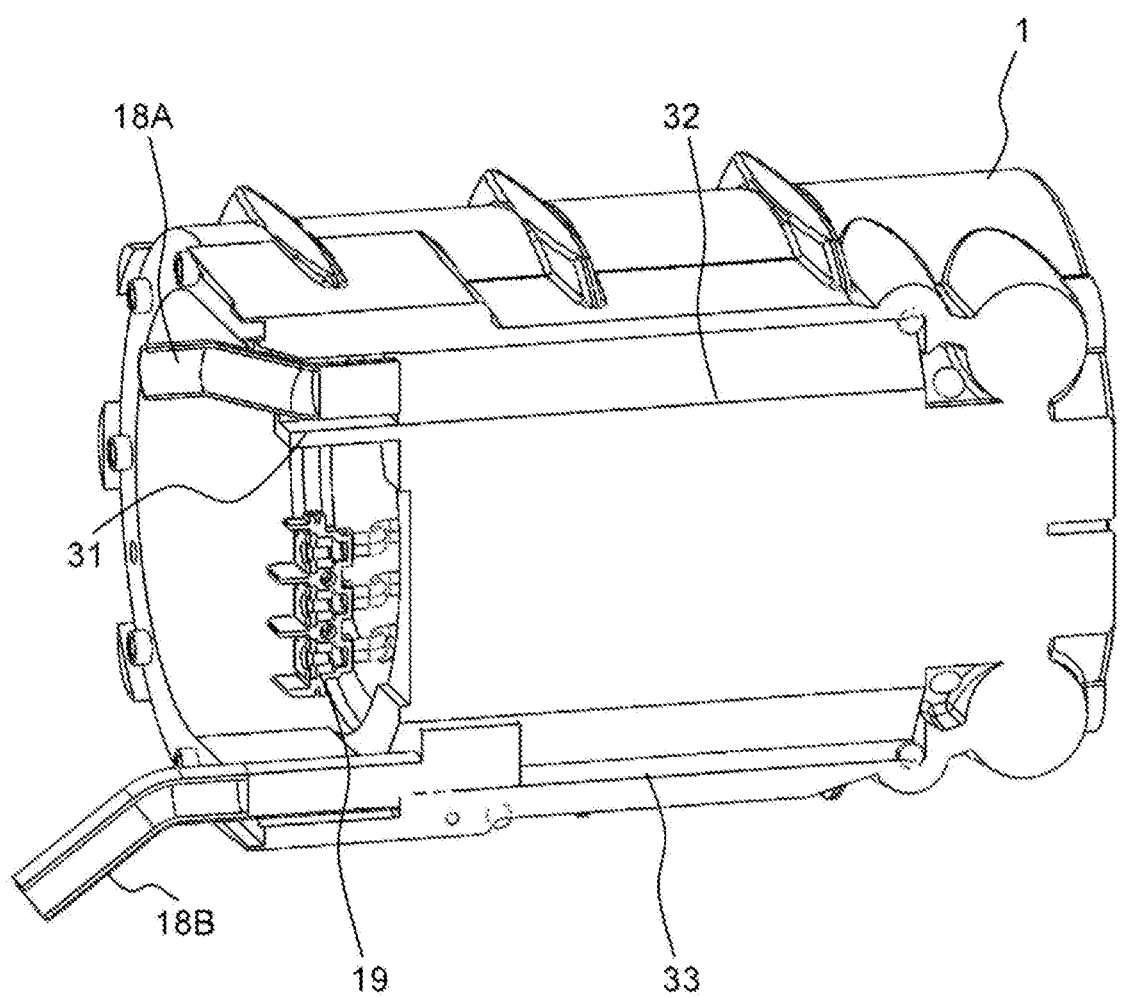
FIG. 10 is a cross-sectional perspective view of the motor and the inverter portion according to a sixth embodiment of the present invention.

FIG. 10 is a cross-sectional perspective view of the motor and the inverter portion of the electric system of the sixth embodiment.

In the motor 1, an oily medium flows to a coil end in which the winding 12 protrudes from an end surface of a stator core or the coil end is immersed in the oily medium, so that cooling capability is obtained, and the coil end also exists on the side far from the gear assembly 3. In the electric system of the present embodiment, by providing the oil passage 32 communicating from the gear assembly 3 to the side far from the gear assembly 3 of the motor 1, an oily medium scraped upward by the gears 22A and 22B in the gear box 21 can flow to the coil end on the side far from the gear assembly 3 of the motor 1, and the cooling capability of the winding 12 can be improved. Further, the oily medium can also be used for cooling a bearing on the side far from the gear assembly 3.

Furthermore, by providing the oil passage 33 leading from the side far from the gear assembly 3 of the motor 1 to the gear assembly 3, an oily medium can be returned to the gear assembly 3 from the side far from the gear assembly 3 of the motor 1, and the oily medium can circulate through the entire electric system.

Note that, in FIG. 10, the oil passages 32 and 33 are provided between the motor 1 and the inverter 2. However, the oil passages 32 and 33 may be provided on the top side (upper side) in the vertical direction of the motor 1, on the side opposite to the inverter 2 of the motor 1, or the like, and are not limited to the positions illustrated in FIG. 10. Note that, although FIG. 10 illustrates a cross-sectional view of positions of the oil passages 32 and 33 so that the oil passages 32 and 33 can be seen, a pipeline is actually formed. Further, shapes of the oil passages 32 and 33 are not limited to the shapes illustrated in FIG. 10, and may be cylindrical or the like as long as a pipeline is formed.

Note that the present invention is not limited to the above-described embodiment, and includes various variations and equivalent configurations within the scope of the appended claims. For example, the above embodiments are described in detail for easy understanding of the present invention, and the present invention is not necessarily limited to one that includes all the described configurations. Further, a part of a configuration of one embodiment may be replaced with a configuration of another embodiment. Further, a configuration of a certain embodiment may be added to a configuration of another embodiment. Further, for part of a configuration of each embodiment, another configuration may be added, deleted, or replaced with.

REFERENCE SIGNS LIST 1 motor
2 inverter
3 gear assembly
10 stator
11 rotor
12 winding
16 frame
16A cooling water flow path
17 shaft
18A upper pipe
18B lower pipe
18D inlet portion
18E outlet portion
18F bent portion
19 bus bar
21 gear box
22A, 22B, 22C, 22D gear
23 gear output shaft
30 fin
31 liquid reservoir
31A discharge hole
32, 33 axial oil passage

The invention claimed is:

1. An electric system comprising:
a motor unit including a stator and a rotor, the motor unit being cooled by a refrigerant;
an inverter unit that supplies electric power to a winding of the stator;
a wiring portion that transmits electric power output from the inverter unit to the motor unit; and
a pipe that supplies or discharges the refrigerant to or from the motor unit, wherein
the wiring portion is provided at a position at which the wiring portion can exchange heat with an oil-containing medium cooled by the pipe,
the pipe has a protruding portion protruding from an outer surface of the pipe, and
the wiring portion is provided immediately below the protruding portion.

2. The electric system according to claim 1, further comprising
a gear unit that reduces a rotation speed of the rotor and is lubricated by the oil-containing medium, wherein
the pipe is provided at a position at which the pipe can exchange heat with the oil-containing medium scraped upward by rotation of a gear of the gear unit.

3. The electric system according to claim 1, wherein the wiring portion is provided immediately below the pipe.

4. The electric system according to claim 1, wherein
the pipe has a bent portion bent downward, and
the wiring portion is provided immediately below the bent portion.

5. The electric system according to claim 1, further comprising
a liquid reservoir that stores the oil-containing medium, the liquid reservoir being provided below the pipe.

6. The electric system according to claim 5, wherein
the liquid reservoir has a discharge portion that discharges the oil-containing medium in a manner that the oil-containing medium is in contact with the wiring portion.

7. The electric system according to claim 1, wherein
an inlet portion through which the refrigerant flows into the pipe is provided at a position higher than an outlet portion at which the pipe is connected to a cooling flow path of the motor unit.

8. The electric system according to claim 7, wherein
the pipe has an inclined portion between the inlet portion and the outlet portion, the inclined portion having a height in a vertical direction increasing toward the inlet portion, and
the wiring portion is provided immediately below a position of connection between the outlet portion and the inclined portion.

9. The electric system according to claim 1, further comprising:
at a position overlapping the pipe in a vertical direction,
a first oil passage through which the oil-containing medium flows from an output shaft side of the motor unit to a side far from the output shaft of the motor unit; and
a second oil passage through which the oil-containing medium flows from the side far from the output shaft of the motor unit to the output shaft side, wherein
the first oil passage is in contact with the pipe, and the oil-containing medium in the first oil passage is cooled by the refrigerant in the pipe.

* * * * *